US012638599B2

(12) United States Patent
Ahn et al.

(10) Patent No.: US 12,638,599 B2
(45) Date of Patent: May 26, 2026

(54) METHOD AND DEVICE FOR TOMOGRAPHY OF RYDBERG ATOM GRAPH USING LOCATION- ADJUSTABLE ANCILLA QUBIT

(71) Applicant: Korea Advanced Institute of Science and Technology, Daejeon (KR)

(72) Inventors: Jaewook Ahn, Daejeon (KR); Kangheun Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 245 days.

(21) Appl. No.: 18/474,881

(22) Filed: Sep. 26, 2023

(65) Prior Publication Data

US 2024/0353579 A1 Oct. 24, 2024

(30) Foreign Application Priority Data

Apr. 11, 2023 (KR) ........................ 10-2023-0047722
Aug. 11, 2023 (KR) ........................ 10-2023-0105787

(51) Int. Cl.
*G01T 1/00* (2006.01)
*G06N 10/70* (2022.01)

(52) U.S. Cl.
CPC .............. *G01T 1/00* (2013.01); *G06N 10/70* (2022.01)

(58) Field of Classification Search
CPC ................................. G01T 1/00; G06N 10/70
See application file for complete search history.

(56) References Cited

U.S. PATENT DOCUMENTS

| | | | |
|---|---|---|---|
| 2019/0049495 A1* | 2/2019 | Ofek ...................... | G06N 10/70 |
| 2020/0185120 A1* | 6/2020 | Keesling Contreras ..................... | |
| | | | G21K 1/006 |
| 2021/0279631 A1* | 9/2021 | Pichler .................. | G06N 10/60 |
| 2021/0383189 A1* | 12/2021 | Cong ..................... | G06N 3/045 |
| 2024/0346352 A1* | 10/2024 | Bluvstein .............. | G06N 10/70 |

* cited by examiner

*Primary Examiner* — Hugh Maupin
(74) *Attorney, Agent, or Firm* — Lee & Hayes, P.C.

(57) ABSTRACT

The present disclosure relates to a method and device for the tomography of a Rydberg atom graph using a location-adjustable ancilla qubit. The method and device may be configured to prepare at least one ancilla qubit around a Rydberg atom graph of interest having at least one atom, measure interactions between the Rydberg atom graph and the ancilla qubit while adjusting a location of the ancilla qubit around the Rydberg atom graph, and reconstruct a quantum state of the Rydberg atom graph based on the measured interactions.

11 Claims, 10 Drawing Sheets

System of interest (X)  Ancilla atom (A)

METHOD AND DEVICE FOR TOMOGRAPHY OF RYDBERG ATOM GRAPH USING LOCATION- ADJUSTABLE ANCILLA QUBIT

CROSS-REFERENCE TO RELATED APPLICATION

This application is based on and claims priority under 35 U.S.C. 119 to Korean Patent Application Nos. 10-2023-0047722, filed on Apr. 11, 2023, and 10-2023-0105787, filed on Aug. 11, 2023 in the Korean intellectual property office, the disclosures of which are herein incorporated by reference in their entireties.

TECHNICAL FIELD

The present disclosure relates to a method and device for the tomography of a Rydberg atom graph using a location-adjustable ancilla qubit.

BACKGROUND OF THE DISCLOSURE

A tomographic reconstruction of the many-body quantum state of a scalable qubit system is of paramount importance in quantum computing technologies. Quantum information processing using quantum many-body systems is drawing considerable attention in recent years because of their promising applications in quantum technologies as well as fundamental importance thereof. As an ultimate tool to evaluate the quantum systems, quantum state tomography (QST) aims to reconstruct the state of a system of interest by using a set of linearly independent measurements on the system. QST is required for all quantum information processing steps, which include preparation, manipulation, and measurement steps and require state preparation characterization, quantum process tomography, and measurement tomography, respectively.

Despite the necessity of QST, especially, in the case of a large scale system, experimental demonstrations are limited. This attributes mainly to the huge size of orthogonal measurement operators, which grows exponentially as the size of a many-body system is increased. In addition, if qubit operations are near perfect, QST may use such a set of measurement operators composed of tensor products of Pauli matrices. However, such an ideal approach to use tomographic completion and a minimal set of measurements is difficult for a large scale qubit system, and necessary Pauli matrix-based measurement operators often require the precise and individual addressing of each qubit.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

As described above, a conventional approach using base measurements that are tomographically orthogonal to each other often requires precise and individual control over a qubit, which is often difficult experimentally.

Accordingly, the present disclosure proposes that as a quantum-mechanically robust alternative, reconfigurable ancillas of which continuously-tunable interactions can easily generate independent base measurements tomographically, which are sufficient for the quantum state reconstruction of a system of interest, is used.

The present disclosure provides a method and device for the tomography of a Rydberg atom graph using a location-adjustable ancilla qubit, as a new path for analyzing a high-level quantum state of scalable qubit systems.

A method for the tomography of a Rydberg atom graph according to an embodiment of the present disclosure may include preparing at least one ancilla qubit around a Rydberg atom graph having at least one atom, measuring interactions between the Rydberg atom graph and the ancilla qubit while adjusting a location of the ancilla qubit around the Rydberg atom graph, and reconstructing a quantum state of the Rydberg atom graph based on the measured interactions.

A computer device for tomography of a Rydberg atom graph according to an embodiment of the present disclosure may include memory and a processor connected to the memory and configured to execute at least one instruction stored in the memory. The processor may be configured to prepare at least one ancilla qubit around a Rydberg atom graph of interest having at least one atom, measure interactions between the Rydberg atom graph and the ancilla qubit while adjusting a location of the ancilla qubit around the Rydberg atom graph, and reconstruct a quantum state of the Rydberg atom graph based on the measured interactions.

A computer program stored in a non-transitory computer-readable recording medium in order to execute the method for the tomography of the Rydberg atom graph in a computer device according to an embodiment of the present disclosure may include preparing at least one ancilla qubit around a Rydberg atom graph having at least one atom, measuring interactions between the Rydberg atom graph and the ancilla qubit while adjusting a location of the ancilla qubit around the Rydberg atom graph, and reconstructing a quantum state of the Rydberg atom graph based on the measured interactions.

According to embodiments of the present disclosure, a reliable, high-accuracy, and complete quantum state for a Rydberg atom graph can be reconstructed by using an ancilla qubit. In the present disclosure, independent base measurements for a system of interest corresponding to the Rydberg atom graph can be easily generated by consistently adjusting the location of an ancilla qubit, and the quantum state of the system can be reconstructed based on the independent base measurements.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, various embodiments of the present disclosure are described with reference to the accompanying drawings.

Figure 1:
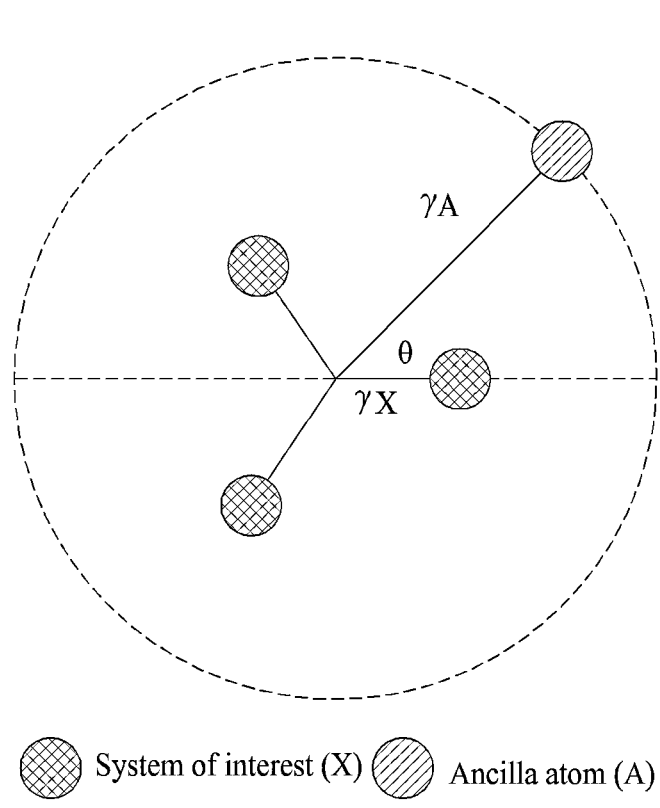
FIG. 1 is a diagram for describing the concept of quantum state tomography using a location-adjustable ancilla qubit according to an embodiment of the present disclosure.

FIG. 1 is a diagram for describing the concept of quantum state tomography using a location-adjustable ancilla qubit according to an embodiment of the present disclosure.

Referring to FIG. 1, in the present disclosure, continuously tunable measurement operators, which are defined as a system of an ancilla qubit (or ancilla qubits) of which relative locations with respect to a system of interest X are freely configurable, is considered. For example, one ancillary qubit A is rotated in a way to bear resemblance to computer tomographic scanning, around a set of atoms, which are the system of interest X, so that the relative angular positions of the ancilla qubit A generate a set of independent and continuously tunable measurements. Accordingly, QST is performed, and the quantum state of the system X is reconstructed. Rydberg atom systems are considered as a prototypical many-body quantum system with which attempts on quantum tomography are done only partially or through computer simulations.

Hereinafter, the working principle of freely configurable ancilla QST of Rydberg atom arrays is theoretically formulated, and experimental setup and procedure are described. Experimental results are summarized for N=2, 3, 4, and 6 atom systems. Such a method is compared with numerically most-likely estimation results, along with discussions on scaling prospects and general applicability to larger and arbitrary Rydberg atom graphs.

Operation Principle

In the present disclosure, how a continuously configurable ancilla can be used for the quantum state tomography of an N-body system, that is, a method of generating a sufficient number of independent measurements, is described. In the present disclosure, as in FIG. 1, a case in which a system of interest X, which is in an unknown quantum state $\rho X'$, and an ancilla system A are present, as a Rydberg atom graph, is considered.

The quantum state $\rho X$ is a linear combination of orthogonal base states $\{O_i\}$, that is, a set of 4N matrices that satisfy $tr(O_iO_j)=2^N\delta_{ij}$, where N is the number of qubits included in the system X. In one qubit example, that is, N=1, the orthogonal base states are $\{O_i\}=\{\hat{I}, \hat{\sigma}_x, \hat{\sigma}_y, \hat{\sigma}_z\}$. In general, the quantum state $\rho X$ is given by Equation 1.

$$\rho_X = \sum_{i=1}^{4^N} \eta_i O_i \tag{1}$$

where the set of the coefficients $\{\eta_i|i\in\{1, \ldots ,4^N\}\}$ determines the quantum state $\rho x$, so the goal of quantum state tomography is to find $\{\eta_i\}$.

To this end, there is introduced a set of measurement superoperators $\{\mathcal{M}_k(\rho)|k \in\{1, \ldots, K\}\}$, where K is the number of all measurements, and each of the superoperators performs a different measurement on $\rho$. Equation 2 is obtained by applying an operation $\mathcal{M}_k$ on both sides of Equation 1.

$$\underbrace{\mathcal{M}_k(\rho_X)}_{P_k} = \sum_{i=1}^{4^N} \eta_i \underbrace{\mathcal{M}_k(O_i)}_{Q_k^i} \tag{2}$$

In this case, the left hand side of Equation 2 is a probability distribution $P_k=\mathcal{M}_k(\rho_x)$, which is obtained experimentally, and the right hand side of Equation 2 is a linear combination of quasi probabilities determined by the operation Mk that acts on all of the orthogonal base states. In a linear algebraic form, Equation 2 is given by Equation 3.

$$\begin{pmatrix} P_1 \\ \vdots \\ P_K \end{pmatrix} = \underbrace{\begin{pmatrix} Q_1^1 & \cdots & Q_1^{4^N} \\ \vdots & \ddots & \vdots \\ Q_K^1 & \cdots & Q_K^{4^N} \end{pmatrix}}_{\hat{Q}} \begin{pmatrix} \eta_1 \\ \vdots \\ \eta_{4^N} \end{pmatrix} \tag{3}$$

where $\hat{Q}$ is a matrix with K rows and $4^N$ columns. In the case of a non-square matrix as in Equation 3, Moore-Penrose inverse may be used to determine the least square estimate solution of the linear algebraic equation. However, the Moore-Penrose inverse provides a unique estimate, only for a case in which the matrix rank of $\hat{Q}$ is equal to the number of matrix columns, that is, Rank$(\hat{Q})=4^N$ In this case, the matrix rank is the dimension of a row (column) space, and both spaces have the same dimension. Accordingly, more than $4^N$ independent measurements, that is, $K\geq4^N$, are necessary.

A measurement superoperator M is now introduced. The many-body Hamiltonian of Rydberg atoms is well described by an Ising spin Hamiltonian. In this case, pseudo-spin states $|0>$ and $|1>$ represent the ground and Rydberg atoms, respectively. In the unit of h=1, the Hamiltonian of the atoms X and an ancilla qubit A in the system is given by Equation 4.

$$\hat{H} = \frac{\Omega}{2} \sum_{i\in X\cup A} \hat{\sigma}_x^{(i)} - \frac{\Delta}{2} \sum_{i\in X\cup A} \hat{\sigma}_z^{(i)} + \sum_{i<j} V_{ij}\hat{n}_i\hat{n}_j \tag{4}$$

where $\Omega$ indicates a Rabi frequency, A indicates detuning, $$V_{ij} = C_6/r_{ij}^6$$

indicates a van derWaals interaction between two Rydberg atoms, and $\hat{n}=(\hat{\sigma}_z+1)/2$ indicates Rydberg excitation. In the present disclosure, the superoperators may be defined as in Equation 5.

$$\mathcal{M}_{n,\theta}(\rho_X) = tr(\hat{\Pi}_n\hat{U}(\theta)(\rho_X \otimes |0\rangle_A\langle 0|_A)\hat{U}^\dagger(\theta)\hat{\Pi}_n) \tag{5}$$

where n is a bit string for a spin configuration of the atoms in $X \cup A$, $\theta$ is an angular position of the ancilla as in FIG. 1, $\Pi_n$ is a projective measurement onto an n-th bit string spin basis, $|0\rangle_A$ is an initial spin state of the ancilla, and $U(\theta)$ is the time evolution of $\beta x A \cup A$ by $\hat{H}$ that depends on $\theta$. As $\theta$ may be continuously adjustable and an angle-dependent time evolution $\hat{U}(\theta)=\exp(-i\hat{H}(\theta)t_E)$ for a sufficient time the results in the entanglement of X and A differently for a different angle $\theta$, sufficiently many superoperators, that is, $K=2^{N+1}\times\|\{\theta\}\|\geq 4^n$, can be generated, which are in general independent with each other.

Experimental Procedure

Figure 2A:
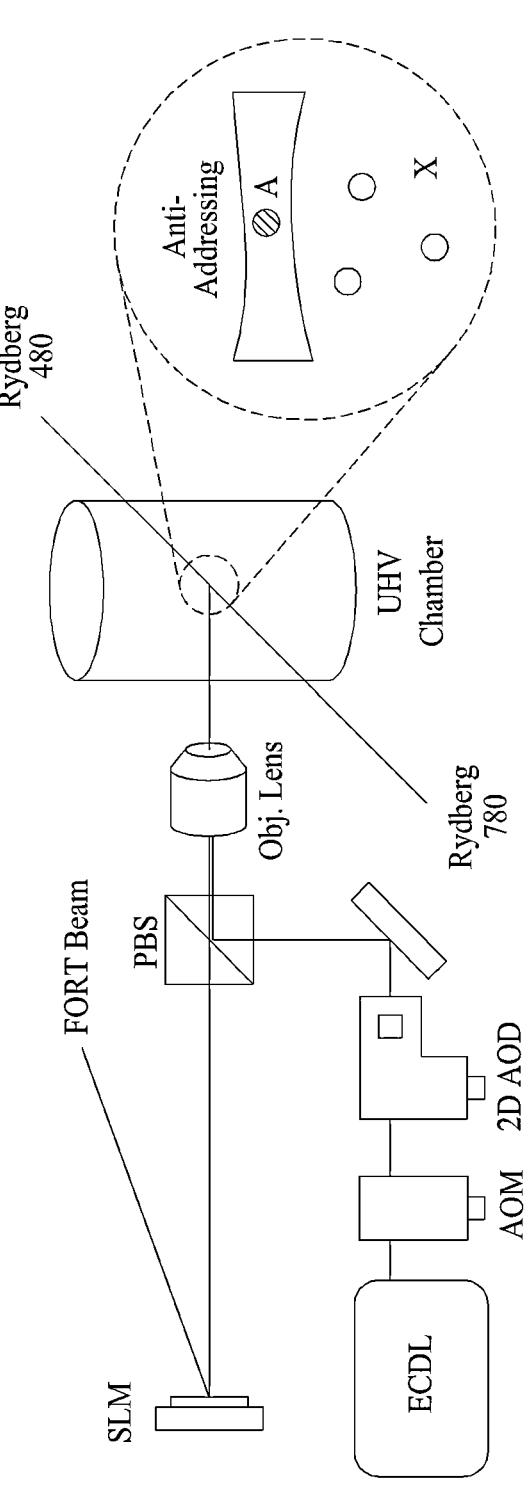
FIG. 2A is a diagram illustrating a Rydberg atom-programmable quantum simulator in experiments according to an embodiment of the present disclosure.

FIG. 2A is a diagram illustrating a Rydberg atom-programmable quantum simulator in experiments according to an embodiment of the present disclosure.

Referring to FIG. 2A, experimental quantum state tomography was performed by using a Rydberg-atom programmable quantum simulator. This is setup which has an additional part assembled to locally address individual atoms and which has been primarily previously reported elsewhere. Cold rubidium atoms ($^{87}$Rb) arranged in the two- or three-dimensional space were used as optical tweezers (i.e., far off-resonant optical dipole traps). The atoms were initially cooled down to a temperature of 30μK or less via a Doppler and polarization gradient coolings (PGC) in a magneto optical trap (MOT), and were loaded into the optical tweezers individually. Both the qubit atoms and the ancilla qubits (or atoms) were deterministically prepared for wanted target places by an atom rearrangement process, and were optically pumped to the ground state $[0\rangle=|5S_{1/2}, F=2, m_F=2\rangle$. Thereafter, the atoms were excited to a Rydberg state $[0\rangle\rightarrow|5P_{3/2},$ F=3, $m_F=3\rangle\rightarrow|1\rangle$ by two-photon laser excitation $|1\rangle=71S_{1/2}, J=\frac{1}{2}, m_J=\frac{1}{2}\rangle$. To this end, two external cavity diode lasers having 780 nm and 480 nm wavelengths, respectively, were used.

Qubit operations were performed by the Rydberg excitation of the system atoms. In this case, individual atom addressing (called anti-addressing (i.e., Rydberg excitation suppression) was performed as illustrated in FIG. 2A. An anti-addressing beam was spatially modulated into a 2D acousto-optic deflector (2D-AOD) and was switched on and off at a time scale of a few nanosecond rise and fall times through an acousto-optic modulator (AOM). The 2D-AOD was used to off-detune the Rydberg-atom excitation of chosen atoms. That is, the 2D-AOD split and deflected the beam in a wide range for a set of anti-addressing beams, which was applied to apply very large A, through an AC Stark shift. The as-prepared anti-addressing beams were then merged with the optical tweezers sculpted by a spatial light modulator (SLM) before the beams were sent to the atoms in an ultra-high vacuum chamber.

Figure 2B:
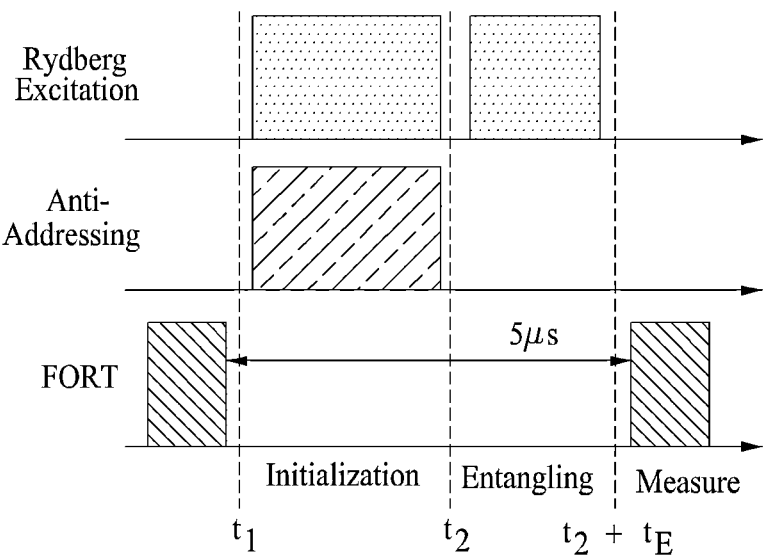
FIG. 2B is a diagram illustrating an experiment pulse sequence for laser operations in experiments according to an embodiment of the present disclosure.

FIG. 2B is a diagram illustrating an experiment pulse sequence for laser operations in experiments according to an embodiment of the present disclosure.

Referring to FIG. 2B, while all of the optical tweezer (FORT) beams were first turned off at $t_1$ and the Rydberg excitation of the system atoms and the ancilla qubit is tuned on globally, the anti-addressing beam for the ancilla qubit was turned on locally, so that a total system ($X \cup A$) was prepared as $\rho X\mu A (t_2)=\rho_X\otimes|0\rangle\langle 0|_A$. Thereafter, in the state in which the anti-addressing was turned off, the Rydberg excitation was performed globally again to entangle the total system, that is, $\beta X \cup A (t=t_2+T_E)=\hat{U}(\theta) \rho X \cup A (t_2)\hat{U}^\dagger(\theta)$ After the qubit operations, qubit measurements were carried out by taking an image of the remaining atoms in $|0\rangle$ through an electron multiplying charge-coupled device (EMCCD), after other atoms in $|1\rangle$ were anti-trapped by the optical tweezers. All of the steps of the above process were repeated with various relative angles $\theta$ between the system and the ancilla qubit to collect projection measurements $\Pi_n$ of the total system, that is, $P_n(\theta)=\mathcal{M}_{n,\theta}(\rho x)$ probability values, which were used to reconstruct the tomographic information $\rho X$ of the system.

Experimental Results

Figure 3:
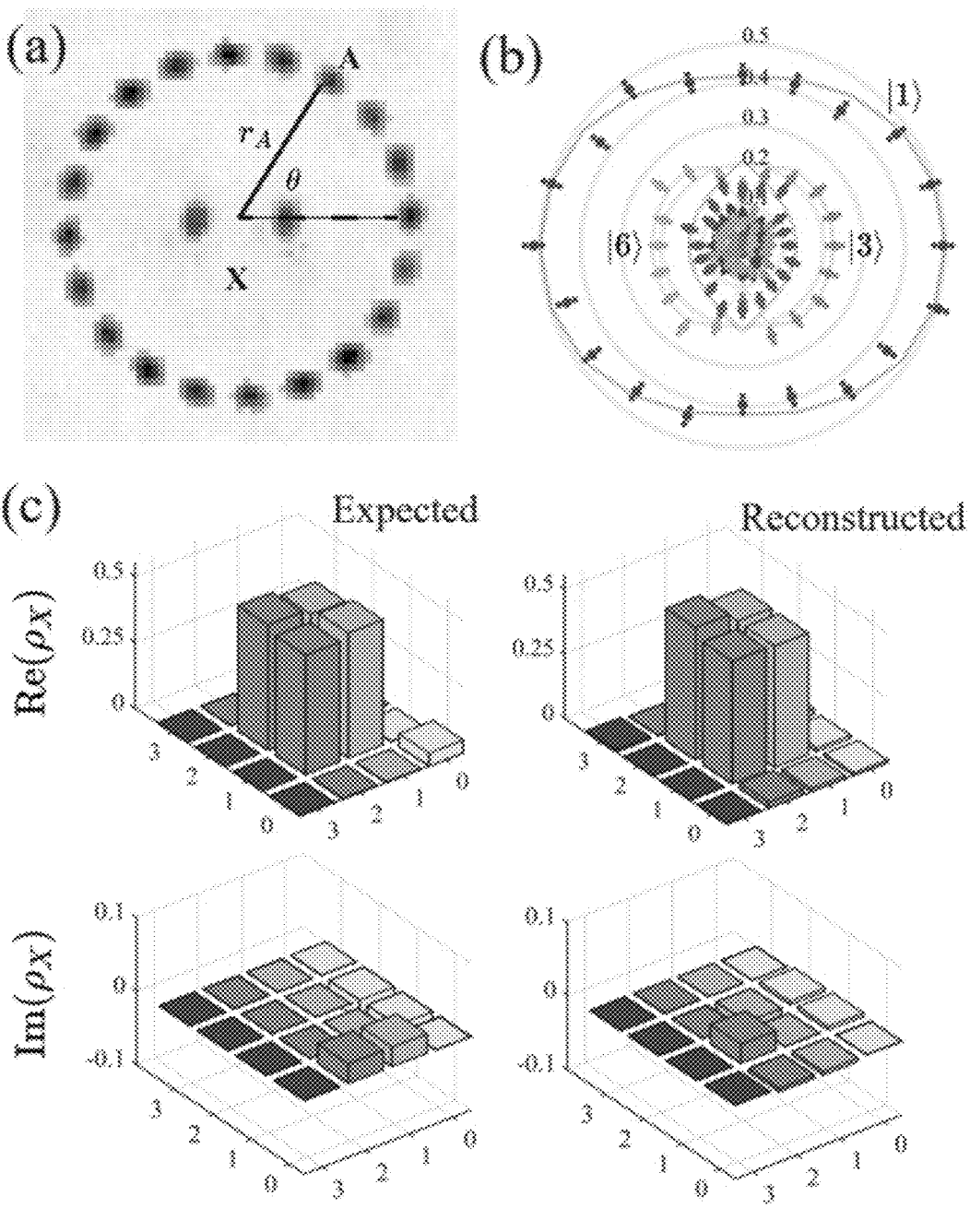
FIGS. 3 and 4 are diagrams illustrating experiment results according to an embodiment of the present disclosure.

FIGS. 3 and 4 are diagrams illustrating experiment results according to an embodiment of the present disclosure.

Referring to FIGS. 3 and 4, quantum state tomography of four different systems X of N=2, 3, 4, and 6 atoms was performed, and the results of which are summarized. The first N=2 experimental results are illustrated in FIG. 3, and other three experimental results are in FIG. 4.

In the first experiment, the system of interest X is a two-atom system (N=2) as illustrated in the center of FIG. 3(a) and uses one ancilla qubit A as indicated in the outskirts of FIG. 3(b). Other angular positions of the ancilla qubit are indicated for reference. 20 angular measurements were performed with $\theta_j=2\pi/k$ for j=1, . . . , 20, and kept the distance of the ancilla qubit A in the same manner from the center of the system X in order to satisfy $K=20\times 2^{N+1}>4^N$. A Bell state, such as Equation 6, was selected as a known state $\rho X$ for the quantum state tomography.

$$\rho_X \approx |\psi_{Bell}\rangle\langle\psi_{Bell}| \qquad (6)$$

where $|\psi_{Bell}\rangle=(|01\rangle+|10\rangle)/\sqrt{2}$ is obtained by placing the two atoms of X within a Rydberg blockade distance. An actual state $\rho X$ is numerically estimated by taking into account experimental errors, including state preparation and measurement errors, individual and collective dephasing contributions, and control errors.

A polar plot in FIG. 3(b) illustrates measured probabilities $P_n(\theta)=M_{n,\theta}(\rho x)$ as a function of $\theta$. In this case, each color indicates a different bit string 3-spin state n. Observed probabilities are dominant for states $[n=1\rangle=|00\rangle_X\otimes|1\rangle_A$, $|3\rangle=|01\rangle_X\otimes|1\rangle A$, $|6\rangle=|10\rangle_X\otimes|1\rangle_A$, and $|0\rangle=|00\rangle_X\otimes|0\rangle_A$. Their probabilities $P_1(\theta)$ (red), $P_3(\theta)$ (yellow), $P_6(\theta)$ (green), and $P_0(\theta)$ (blue) are illustrated in FIG. 3(b) along with other probabilities. An angular behavior of the probabilities may be understood as a Rydberg blockade effect. For example, $P_3(\theta)$ (yellow) is big in the angular region $\{\pi/2<\theta<3\pi/2\}$. In this case, the second atom in the system X is not Rydberg-blockaded from the ancilla qubit. $P_6(\theta)$ (green) is almost zero in the same region because the first atom is Rydberg-blockaded. About 550 experiments were repeated for each angle. Other experimental parameters, including the system and ancilla qubit distances $r_X$ and $T_A$ from the center, Rabi frequencies $\Omega$, and pulse lengths $t_1=t_2-t_1$ and $t_E$ including initialization and entanglement times, respectively, are summarized in Table I.

TABLE 1

| N | $r_X$ (μm) | $r_A$ (μm) | Ω (MHz) | $t_I$ (μs) | $t_E$ (μs) |
|---|---|---|---|---|---|
| 2 | 2.5 | 9 | 0.896 | 0.387 | 0.595 |
| 3 | 5/√3 | 9 | 0.894 | 0.259 | 0.595 |
| 4 | 4 | 10 | 0.855 | 0.275 | 0.563 |
| 6 | 4.5 | 12 | 0.845 | 0.211 | 0.579 |

FIG. 3(c) illustrates the resulting $$\rho_X^{QST}$$

(right) of the quantum state tomography in comparison with $$\rho_X^{Cal}$$

(left) that has been theoretically calculated with experimentally calibrated errors taken into account. The result illustrates a high fidelity as in Equation 7 of the quantum state tomography of the two atoms in the Bell state. In the case of the theoretically calculated $$\rho_X^{Cal}$$

Bayesian mean estimation (BME) was used along with a Markov chain Monte Carlo (MCMC) method in order to avoid unphysical $$\rho_X^{QST}$$

(i.e., of negative probabilities), which is unavoidable due to experimental and statistical errors.

$$\mathcal{F}(N=2) = tr\sqrt{\sqrt{\rho_X^{Cal}} \rho_X^{QST} \sqrt{\rho_X^{Cal}}} = 0.976(9) \tag{7}$$

Similarly, N=3, 4, and 6 atom experiments are illustrated in FIG. 4. In this case, Bayesian mean estimation (BME) using a Markov chain for each of the atom experiments was used. With respect to the N=3, 4, and 6 atom experiments, the unknown states were chosen respectively near their N-qubit W-states as in Equation 8.

$$|\psi\rangle_X^{N=3} \approx \frac{1}{\sqrt{3}}(|001\rangle + |010\rangle + |100\rangle), \tag{8}$$

$$|\psi\rangle_X^{N=4} \approx \frac{1}{2}(|0001\rangle + |0010\rangle + |0100\rangle + |1000\rangle),$$

$$|\psi\rangle_X^{N=6} \approx \frac{1}{\sqrt{6}}(|000001\rangle + \ldots + |100000\rangle)$$

Figure 4A:
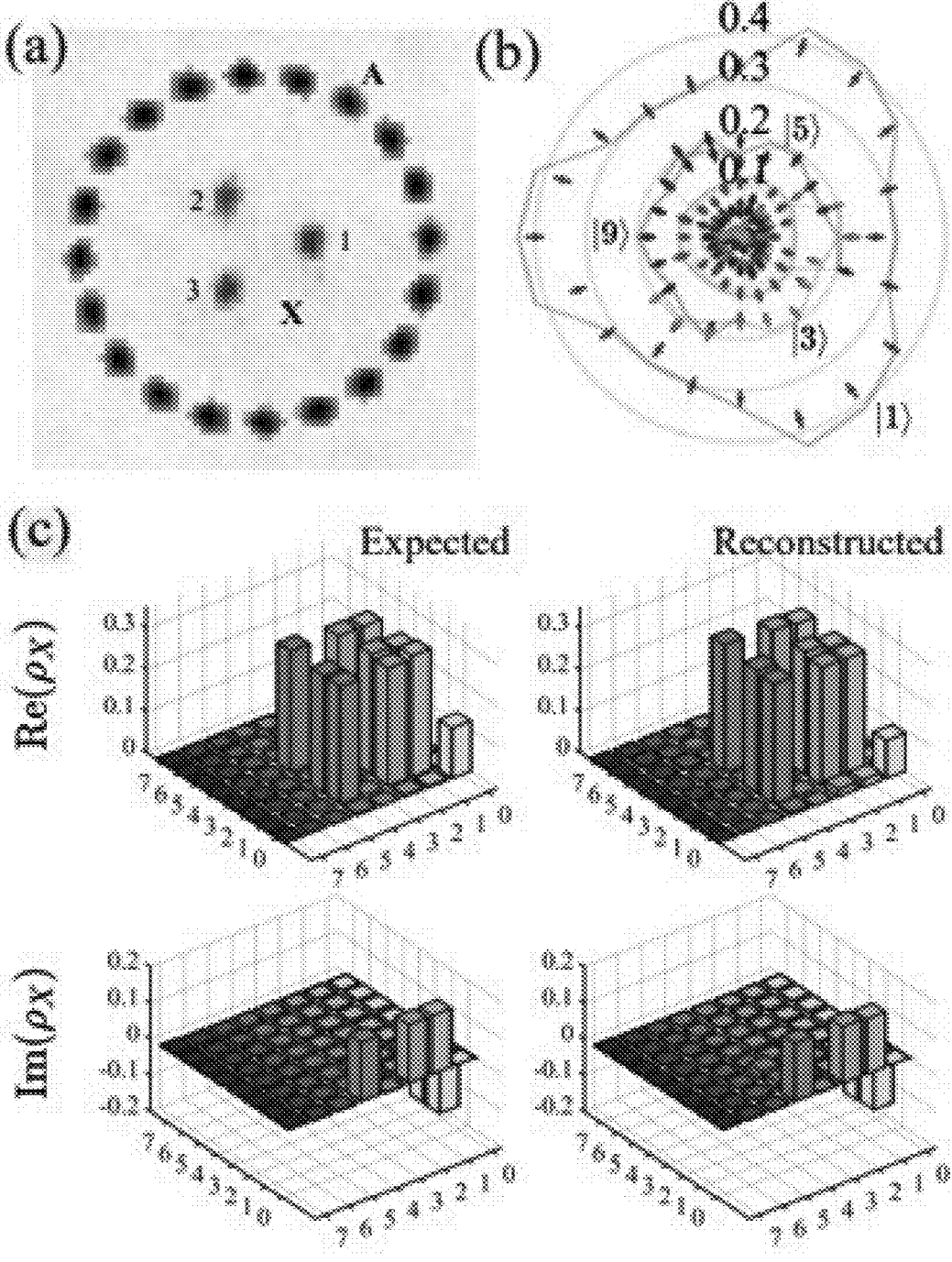
Figure 4B:
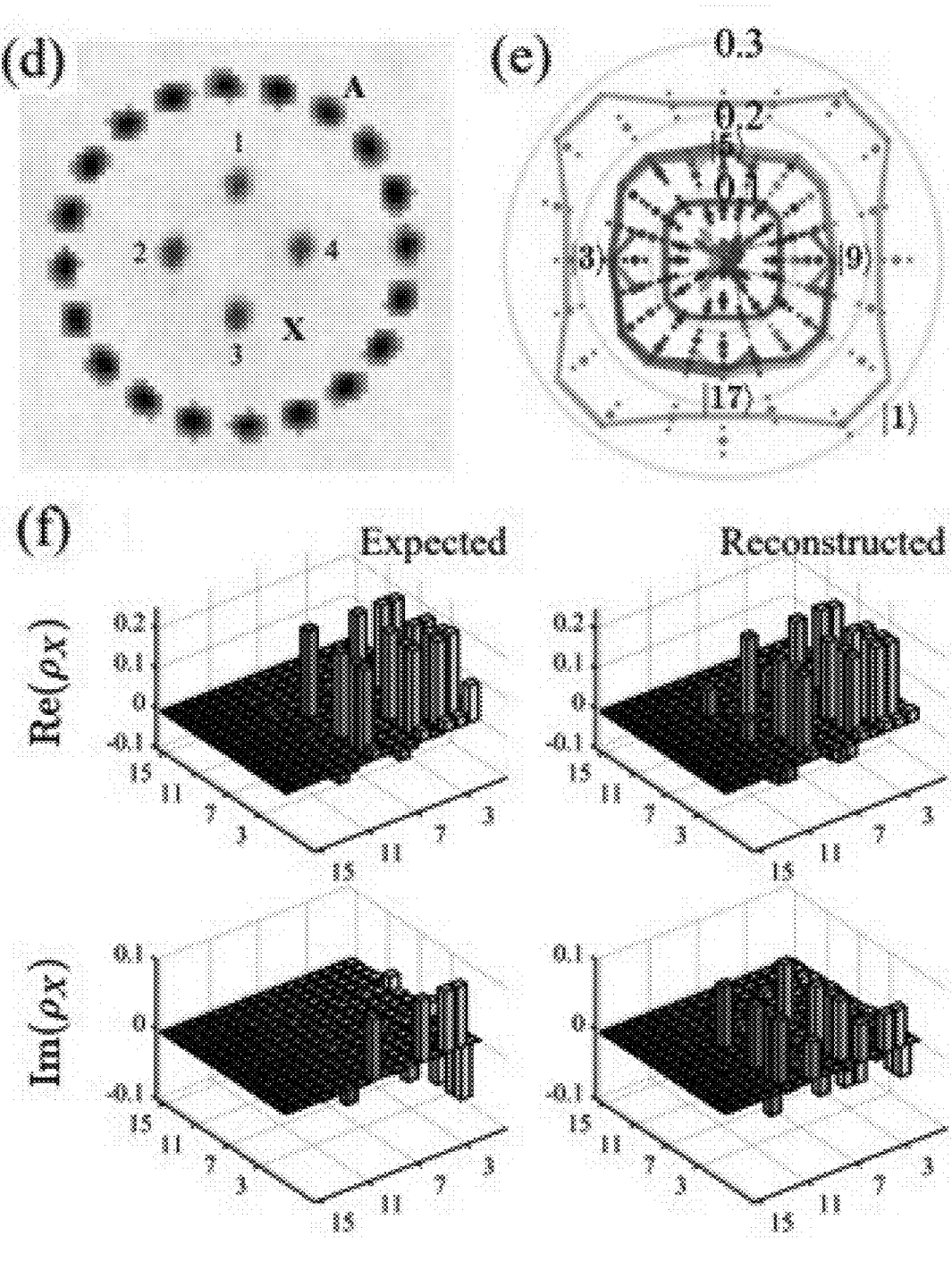
Figure 4C:
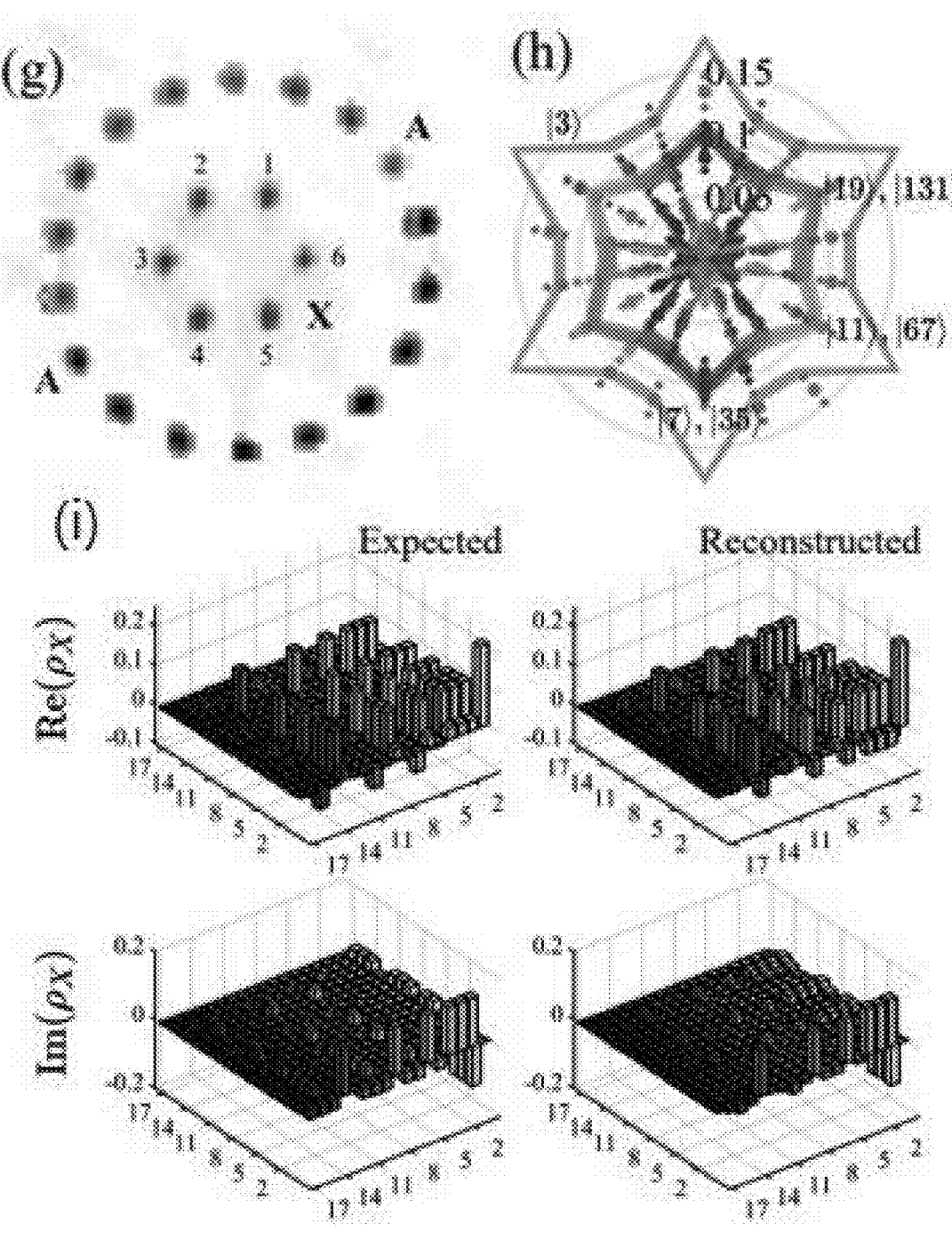

The N=3 and 4 atom experiments are summarized in FIGS. 4(a) to 4(c) and FIGS. 4(d) to 4(f), respectively. In this case, one ancilla qubit was used as illustrated in FIGS. 4(a) and 4(c). In the case of the N=6 atom experiment in FIGS.

4(f) to 4(i), two ancilla qubits were used as illustrated in FIG. 4(g). Experimentally measured probabilities $P_n(\theta)$ are illustrated in FIGS. 4(b), 4(d), and 4(g) with respect to $$\rho_X^{N=3}, \rho_X^{N=4}, \text{ and } \rho_X^{N=6},$$

respectively. The 120° (N=3), 90° (N=4), and 60° (N=6) and dependence of angular probability measurements are clearly illustrated as expected from their Rydberg blockade natures between constituent atoms in the system X and the ancilla qubit A. About 1300, 550, and 700 to 1000 experiments were repeated with respect to angle measurements of N=3, 4, and 6, respectively. In all the cases, the results of the quantum state tomography in FIGS. 4(c), 4(e), and 4(h) show high fidelities $\mathcal{F}$ (N=3)=0.975(3), $\mathcal{F}$ (N=4)=0.88 (1), and $\mathcal{F}$ (N=6)0.85(1) of the quantum state reconstructions. For the sake of calculation convenience of the N=6 atom experiment which was performed in a strong Rydberg blockade condition, that is, $r_X$=4.5 μm<<$r_A$≈10 μm, it is to be noted that anti-blockaded states of nonzero adjacent double excitations were ignored.

DISCUSSION

Experimental tests of the continuously configurable ancilla qubit were successfully performed on a set of strongly-symmetric system structures, but it is worthwhile to consider general graphs of random system geometries and the location of a random ancilla qubit (of different distances from the system). As described above, Rank $(\hat{Q})/4^N$=1 is a good measure of measurement (M) independence, which is necessarily satisfied by a sufficient $K>4^N$. Accordingly, whether the condition $K>4^N$ is sufficient is numerically tested. First, the position of the ancilla qubit A is parameterized by using an arbitrary geometry {G} instead of {θ} because as the position of the ancilla qubit does not need to be necessarily bounded to the circle as in FIG. 1. Random graph geometries of the system X and the ancilla qubit A having a fixed state . . . |0 . . . 0>$_A$ were generated by an algorithm with density v=0.1 and an exclusion radius of $r_{exc}$=5 μm. The parameters for the entanglement of the system X and the ancilla qubit A were Ω=1 MHz and $t_E$=$t_\pi$/2. After each random graph was generated, a matrix $\overline{Q}$ for each geometric case was calculated, and the Rank $\hat{Q}$ was numerically computed.

Figure 5:
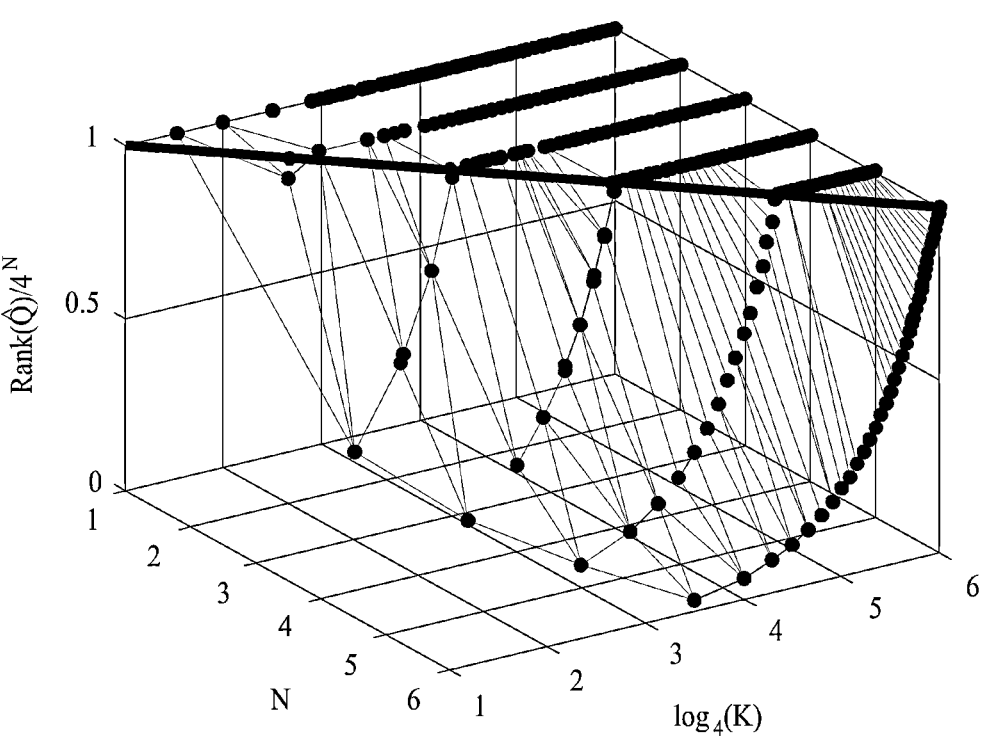
FIG. 5 is a diagram illustrating the results of simulations of random graphs according to an embodiment of the present disclosure.

FIG. 5 is a diagram illustrating the results of simulations of random graphs according to an embodiment of the present disclosure.

FIG. 5 illustrates simulated results for 5000 random graphs, where an x axis is N, a y axis is $log_4K$, and a z axis is Rank($\hat{Q}$)/$_4^N$. A red line in FIG. 5 is the K=$4^N$ condition. At least for N≤6, the method using a freely-configurable ancilla qubit generates independent measurements, so that K≥$4^N$ is a sufficient condition for Rank($\hat{Q}$)/$_4^N$=1.

The independence of angular measurements for a limiting case of a weakly interacting ancilla qubit is described. The ancilla qubit is placed very far from system atoms, that is, $r_A$>>$r_X$. In this case, the Hamiltonian in Equation 4 may be written with three parts as in Equation 9.

$$\hat{H} = \hat{H}_X + (\Omega/2)\sigma_x^{(A)} + \sum_{x \in X} V_{xA}\hat{n}_x\hat{n}_A \tag{9}$$

where $\hat{H}_X$ is the Hamiltonian of X, the second part is the Rabi oscillation of the ancilla qubit, and the last is an interaction between the system A and the ancilla qubit X. Since $V_{xa} \propto (r_A - r_x)^{-6} \ll 1$, the first order perturbation of $\hat{U}(\theta)$ is given as in Equation 10.

$$\hat{U}(\theta) \approx e^{-i(\hat{H}_X + (\Omega/2)\sigma_X^{(A)})t_E} + i\sum_{x\in X} V_{xA}(\theta)\hat{I}_x \qquad (10)$$

where $\hat{I}_x$ is a geometry independent integral term dependent only on the.

When Equation 10 is used in Equation 5, the coefficient $$Q_{n,\theta}^i$$

of the matrix $\hat{Q}$ is given as in Equation 11.

$$Q_{n,\theta}^i \approx c_i + \sum_{x\in X} V_{xa}(\theta)v_{x,i} \qquad (11)$$

where $c_i$ and $v_{x,i}$ are constants for each orthogonal matrix $O_i$. As $V_{xa}(\theta)$ is changed for each $\theta$, the two rows of the $\hat{Q}$ matrix are different from each other. For example, if $\theta_1$ and $\theta_2$ are different from each other and the projection II, is the same, two row vectors of the matrix Q and a difference between the two row vectors are given as in Equation 12.

$$\vec{Q}_{n,\theta_2} - \vec{Q}_{n,\theta_1} = \sum_{x\in X} \{V_{xA}(\theta_2) - V_{xA}(\theta_1)\}\vec{v}_x \qquad (12)$$

where $\vec{u}_x = [u_{x,1} u_{x,2} \ldots u_{x,4}^N]$ is a constant vector for each x. Accordingly, the two row vectors $\vec{Q}_{n,\theta_2}$ and $\vec{Q}_{n,\theta_1}$ are independent with respect to $\theta_1 \neq \theta_2$. Accordingly, the rank Rank($\hat{Q}$) of the matrix can be increased as desired through measurement with a different angle $\theta_s$ until a maximum value Rank($\hat{Q}$)/$4^N$=1 is obtained.

The scalability of a method for a large-scale graph of atoms is described. Under the assumption that the independence of the measurements Rank($\hat{Q}$)/$4^N$=1 with respect to possible technical issues (1) an experimental time and (2) computational power is satisfied for large N, first, the experimental time is described. When the K representation is modified, minimum required different geometric positions are $\|G\|_{min} = 2^{N-N_A}$. In this case, general geometries are {G} instead of {$\theta$}, and $N_A$ is the number of ancilla qubits. As in the previous works, when the number NA of ancilla qubits is increased, the required number of geometries is reduced. However, with respect to each angular point, in order to maintain the ratio of standard deviation and the probability of a multi-nominal distribution of the experiments, the number of required experimental repetition scales increases to $\sim 2^{N+N_A}$ for each angle. Accordingly, a total number of required experimental repetition scales increases to $\sim 2^{N-N_A} \times 2^{N+N_A} = 4^N$, which is not dependent on the number of ancilla qubits. To use one ancilla, that is, $N_A = 1$, is essentially the same as increasing $N_A$. Accordingly, the method of the present disclosure is valid with one ancilla qubit. Second, a tested computational time of the numerical reconstruction is simply greater than the computation limit of current machines because the fitting of the $4^N$ parameter is required, which is exponentially increased depending on the number N of system atoms. This scaling exceeds a desktop memory limit (128 GB) for N=18 and a supercomputer memory limit (32 GB/node×158,976 nodes) for N=26. Furthermore, in the sense of the computational time, although an advanced algorithm is used, the time complexity of the tomography is scaled as $\sim O(4^N)$. Only N=12 may be reconstructed in a week in the desktop (2.5 GHz single thread), and only N=25 may be reconstructed in a week in the supercomputer (442 PFLOPS, assuming $\sim 5$ GFLOPS/core for a desktop). In order to overcome such limits, fast calculation may be considered with parallel computation using an advanced GPU algorithm or other approaches using efficient representation of a wave function, such as a matrix product state (MPS) to reduce the fitting parameter, or applying neural networks.

Figure 6:
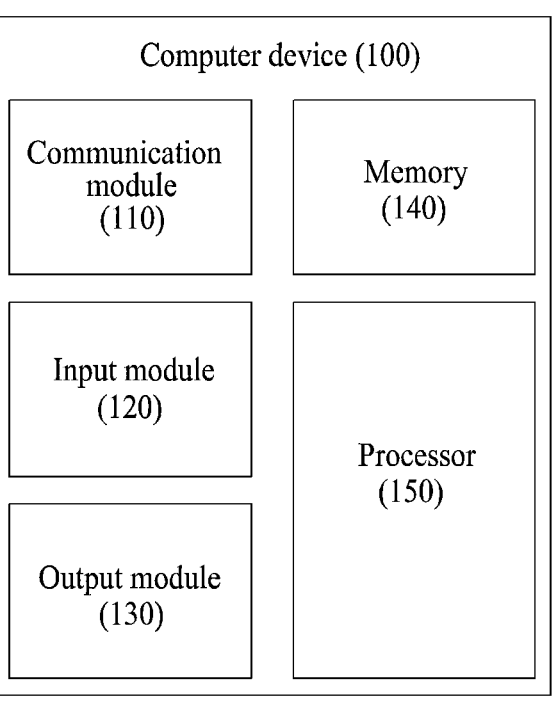
FIG. 6 is a diagram illustrating schematically the construction of a computer device according to various embodiments of the present disclosure.

FIG. 6 is a diagram illustrating schematically the construction of a computer device 100 according to various embodiments of the present disclosure.

Referring to FIG. 6, the computer device 100 is for the tomography of the Rydberg atom graph, and may include at least one of a communication module 110, an input module 120, an output module 130, memory 140, or a processor 150. In some embodiments, at least one of the components of the computer device 100 may be omitted, and at least another component may be added to the computer device 100. In some embodiments, at least two of the components of the computer device 100 may be implemented as one integrated circuit.

The communication module 110 may perform communication with an external device in the computer device 100. The communication module 110 may establish a communication channel between the computer device 100 and the external device, and may perform communication with the external device th rough the communication channel. In this case, the external device may include at least one of another computer device, a base station, or a server. The communication module 110 may include at least one of a wired communication module or a wireless communication module. The wired communication module may be connected to the external device through wires, and may communicate with the external device through wires. The wireless communication module may include at least one of a short-distance communication module or a long-distance communication module. The short-distance communication module may communicate with the external device by using a short-distance communication method. For example, the short-distance communication method may include at least one of Bluetooth, Wi-Fi direct, or infrared data association (IrDA). The long-distance communication module may communicate with the external device by using a long-distance communication method. In this case, the long-distance communication module may communicate with the external device over a network. For example, the network may include at least one of a cellular network, the Internet, or a computer network, such as a local area network (LAN) or a wide area network (WAN).

The input module 120 may input a signal to be used in at least one component of the computer device 100. The input module 120 may be configured to detect a signal that is directly input by a user or to generate a signal by detecting a surrounding change. For example, the input module 120 may include at least one of a mouse, a keypad, a microphone, or a sensing module having at least one sensor. In some embodiments, the input module 120 may include at least one of touch circuitry configured to detect a touch or a sensor circuit configured to measure the strength of a force that is generated by a touch.

The output module 130 may output information to the outside of the computer device 100. The output module 130 may include at least one of a display module configured to visually output information or an audio output module capable of outputting information as an audio signal. For example, the audio output module may include at least one of a speaker or a receiver.

The memory 140 may store various data that are used by at least one component of the computer device 100. For example, the memory 140 may include at least one of volatile memory or nonvolatile memory. The data may include at least one program and input data or output data that are related to the at least one program. The program may be stored in the memory 140 as software including at least one instruction, and may include an operating system, middleware, or an application.

The processor 150 may control at least one component of the computer device 100 by executing a program of the memory 140. To this end, the processor 150 may perform data processing or an operation. In this case, the processor 150 may execute an instruction stored in the memory 140.

According to various embodiments, the processor 150 may substantially perform the tomography of a Rydberg atom graph. Specifically, the processor 150 may prepare at least one ancilla qubit around the Rydberg atom graph. In this case, the Rydberg atom graph may be denoted as a system of interest, such as that described above, and may have at least one atom. In some embodiments, the processor 150 may prepare a single ancilla qubit around the Rydberg atom graph. Furthermore, the processor 150 may measure interactions between the Rydberg atom graph and the ancilla qubit while adjusting the location of the ancilla qubit around the Rydberg atom graph. Furthermore, the processor 150 may reconstruct the quantum state of the Rydberg atom graph based on the measured interactions.

Figure 7:
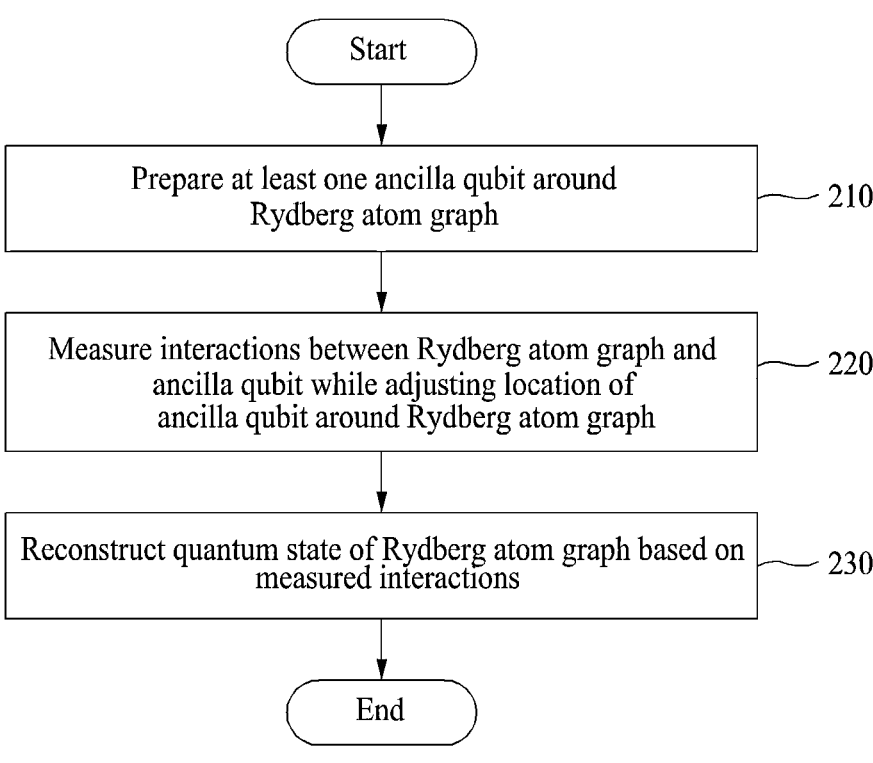
FIG. 7 is a diagram illustrating a method for the tomography of a Rydberg atom graph by the computer device according to various embodiments of the present disclosure.

FIG. 7 is a diagram illustrating a method for the tomography of the Rydberg atom graph by the computer device 100 according to various embodiments of the present disclosure.

Referring to FIG. 7, in step 210, the computer device 100 may prepare at least one ancilla qubit around the Rydberg atom graph. In this case, the Rydberg atom graph may be denoted as a system of interest, such as that described above, and may have at least one atom. Furthermore, the Rydberg atom graph may have various structures, may have a symmetrical structure in some embodiments, and may have a circular structure in an embodiment. In some embodiments, the processor 150 may prepare a single ancilla qubit around the Rydberg atom graph. The processor 150 may prepare an ancilla qubit at a location that is spaced apart from the Rydberg atom graph by a predetermined distance.

Next, in step 220, the computer device 100 may measure interactions between the Rydberg atom graph and the ancilla qubit while adjusting the location of the ancilla qubit around the Rydberg atom graph. In some embodiments, the processor 150 may adjust the location of the ancilla qubit while identically maintaining the distance between the Rydberg atom graph and the ancilla qubit. In an embodiment, the processor 150 may rotate the ancilla qubit around the Rydberg atom graph along a circular path. As the angle of the ancilla qubit to the Rydberg atom graph is changed, the interactions between the Rydberg atom graph and the ancilla qubit are changed. Accordingly, the processor 150 may measure the interactions. The interactions may be measured as independent base measurement values, respectively. In this case, the number of base measurement values may be $4^N$ or more when the number of atoms of the Rydberg atom graph and the number of ancilla qubits each are N.

Next, in step 230, the computer device 100 may reconstruct the quantum state of the Rydberg atom graph based on the measured interactions. Specifically, the processor 150 may reconstruct the quantum state of the Rydberg atom graph based on a set of the base measurement values.

According to embodiments of the present disclosure, a reliable, high-accuracy, and complete quantum state for the Rydberg atom graph can be reconstructed by using the ancilla qubit. In the present disclosure, independent base measurements for a system of interest corresponding to the Rydberg atom graph can be easily generated by consistently adjusting the location of an ancilla qubit, and thus the quantum state of the system can be reconstructed.

In short, the present disclosure provides the method and device for the tomography of a Rydberg atom graph using a location-adjustable ancilla qubit as a new path for analyzing a high-level quantum state of scalable qubit systems.

A method for the tomography of a Rydberg atom graph according to an embodiment of the present disclosure may include step 210 of preparing at least one ancilla qubit around a Rydberg atom graph having at least one atom, step 220 of measuring interactions between the Rydberg atom graph and the ancilla qubit while adjusting the location of the ancilla qubit around the Rydberg atom graph, and step 230 of reconstructing the quantum state of the Rydberg atom graph based on the measured interactions.

In some embodiments, step 210 of preparing at least one ancilla qubit may include a step of preparing a single ancilla qubit around the Rydberg atom graph.

In some embodiments, the ancilla qubit may be prepared by being spaced apart from the Rydberg atom graph by a predetermined distance. The location of the ancilla qubit may be adjusted to maintain the predetermined distance from the Rydberg atom graph.

In some embodiments, the Rydberg atom graph may have a symmetrical structure.

In some embodiments, step 220 of measuring interactions may include a step of measuring the interactions while rotating the ancilla qubit around the Rydberg atom graph.

In some embodiments, the interactions are independent base measurement values, and may be measured, respectively. The number of base measurement values may be $4^N$ when the number of atoms and the number of ancilla qubits each are N.

The computer device 100 for the tomography of a Rydberg atom graph according to an embodiment of the present disclosure may include the memory 140, and the processor 150 connected to the memory 140 and configured to execute at least one instruction stored in the memory 140. The processor 150 may be configured to prepare at least one ancilla qubit around a Rydberg atom graph of interest, which has at least one atom, measure interactions between the Rydberg atom graph and the ancilla qubit while adjusting the location of the ancilla qubit around the Rydberg atom graph, and reconstruct the quantum state of the Rydberg atom graph based on the measured interactions.

In some embodiments, the processor 150 may be configured to prepare a single ancilla qubit around the Rydberg atom graph.

The aforementioned device may be implemented as a hardware component, a software component, and/or a combination of a hardware component and a software component. For example, the device and component described in the embodiments may be implemented by using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. The processing device may perform an operating system (OS) and one or more software applications that are executed on the OS. Furthermore, the processing device may access, store, manipulate, process, and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, another processing configuration, such as a parallel processor, is also possible.

Software may include a computer program, a code, an instruction or a combination of one or more of them, and may configure a processing device so that the processing device operates as desired or may instruct the processing devices independently or collectively. The software and/or the data may be embodied in any type of machine, a component, a physical device, or a computer storage medium or device in order to be interpreted by the processing device or to provide an instruction or data to the processing device. The software may be distributed to computer systems that are connected over a network, and may be stored or executed in a distributed manner. The software and the data may be stored in one or more computer-readable recording media.

The method according to various embodiments may be implemented in the form of a program instruction executable by various computer means, and may be stored in a computer-readable medium. In this case, the medium may continue to store a program executable by a computer or may temporarily store the program for execution or download. Furthermore, the medium may be various recording means or storage means having a form in which one or a plurality of pieces of hardware has been combined. The medium is not limited to a medium that is directly connected to a computer system, but may be ones that are distributed and present in a network. Examples of the medium may be magnetic media such as a hard disk, a floppy disk, and a magnetic tape, optical media such as CD-ROM and a DVD, magneto-optical media such as a floptical disk, and ones configured to store a program command, including ROM, RAM, and a flash memory. Furthermore, examples of another medium may include an app store in which apps are distributed, a site in which other various pieces of software are supplied or distributed, and recording media and/or storage media that are managed in a server.

Various embodiments of this document and the terms used in the embodiments are not intended to limit the technology described in this document to a specific embodiment, but should be construed as including various changes, equivalents and/or alternatives of a corresponding embodiment. In relation to the description of the drawings, similar reference numerals may be used in similar components. An expression of the singular number may include an expression of the plural number unless clearly defined otherwise in the context. In this document, an expression, such as "A or B", "at least one of A and/or B", "A, B, or C" or "at least one of A, B and/or C", may include all of possible combinations of items listed together. Expressions, such as "a first," "a second," "the first", and "the second", may modify corresponding components regardless of its sequence or importance, and are used to only distinguish one component from another component and do not limit corresponding components. When it is described that one (e.g., a first) component is "(functionally or communicatively) connected to" or "coupled with" the other (e.g., a second) component, one component may be directly connected to another component or may be connected to another component through another component (e.g., a third component).

According to various embodiments, each (e.g., a module or a program) of the aforementioned elements may include a single entity or a plurality of entities. According to various embodiments, one or more of the aforementioned components or steps may be omitted or one or more other components or steps may be added. Alternatively or additionally, a plurality of components (e.g., modules or programs) may be integrated into a single component. In such a case, the integrated component may identically or similarly perform a function performed by a corresponding one of the plurality of components before one or more functions of each of the plurality of components are integrated. According to various embodiments, steps performed by a module, a program or another component may be executed sequentially, in parallel, iteratively or heuristically, or one or more of the steps may be executed in different order or may be omitted, or one or more other steps may be added.

The invention claimed is:

1. A method for tomography of a Rydberg atom graph by a computer device, the method comprising:

preparing at least one ancilla qubit around a Rydberg atom graph having at least one atom;

measuring interactions between the Rydberg atom graph and the ancilla qubit while adjusting a location of the ancilla qubit around the Rydberg atom graph; and reconstructing a quantum state of the Rydberg atom graph based on the measured interactions, wherein the interactions are measured as independent base measurement values, respectively, and wherein a number of base measurement values is $4^N$ or more when the atoms and the ancilla qubits each are N in number.

2. The method of claim 1, wherein the preparing of the ancilla qubit comprises preparing a single ancilla qubit around the Rydberg atom graph.

3. The method of claim 1, wherein the ancilla qubit is prepared by being spaced apart from the Rydberg atom graph by a predetermined distance, and wherein the location of the ancilla qubit is adjusted to maintain the predetermined distance from the Rydberg atom graph.

4. The method of claim 1, wherein the Rydberg atom graph has a symmetrical structure, and wherein the measuring of the interactions comprises measuring the interactions while rotating the ancilla qubit around the Rydberg atom graph.

5. A computer device for tomography of a Rydberg atom graph, comprising:

memory; and a processor connected to the memory and configured to execute at least one instruction stored in the memory, wherein the processor is configured to:

prepare at least one ancilla qubit around a Rydberg atom graph of interest having at least one atom, measure interactions between the Rydberg atom graph and the ancilla qubit while adjusting a location of the ancilla qubit around the Rydberg atom graph, and reconstruct a quantum state of the Rydberg atom graph based on the measured interactions, wherein the interactions are measured as independent base measurement values, respectively, and wherein a number of base measurement values is $4^N$ or more when the atoms and the ancilla qubits each are N in number.

6. The computer device of claim 5, wherein the processor is configured to prepare a single ancilla qubit around the Rydberg atom graph.

7. The computer device of claim 5, wherein the ancilla qubit is prepared by being spaced apart from the Rydberg atom graph by a predetermined distance, and wherein the location of the ancilla qubit is adjusted to maintain the predetermined distance from the Rydberg atom graph.

8. A computer program stored in a non-transitory computer-readable recording medium in order to execute the method for the tomography of the Rydberg atom graph in a computer device, the method comprising:

preparing at least one ancilla qubit around a Rydberg atom graph having at least one atom;

measuring interactions between the Rydberg atom graph and the ancilla qubit while adjusting a location of the ancilla qubit around the Rydberg atom graph; and reconstructing a quantum state of the Rydberg atom graph based on the measured interactions, wherein the interactions are measured as independent base measurement values, respectively, and wherein a number of base measurement values is $4^N$ or more when the atoms and the ancilla qubits each are N in number.

9. The computer program of claim 8, wherein the preparing of the at least one ancilla qubit comprises preparing a single ancilla qubit around the Rydberg atom graph.

10. The computer program of claim 8, wherein the ancilla qubit is prepared by being spaced apart from the Rydberg atom graph by a predetermined distance, and wherein the location of the ancilla qubit is adjusted to maintain the predetermined distance from the Rydberg atom graph.

11. The computer program of claim 8, wherein the Rydberg atom graph has a symmetrical structure, and wherein the measuring of the interactions comprises measuring the interactions while rotating the ancilla qubit around the Rydberg atom graph.

* * * * *